(12) United States Patent
Hofstee et al.

(10) Patent No.: US 6,675,182 B1
(45) Date of Patent: Jan. 6, 2004

(54) METHOD AND APPARATUS FOR PERFORMING ROTATE OPERATIONS USING CASCADED MULTIPLEXERS

(75) Inventors: H. Peter Hofstee, Austin, TX (US); Hung C. Ngo, Austin, TX (US); Kevin J. Nowka, Round Rock, TX (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 09/649,446

(22) Filed: Aug. 25, 2000

(51) Int. Cl.[7] ............................................. G06F 15/00
(52) U.S. Cl. ........................................ 708/209; 708/200
(58) Field of Search .................................. 708/209, 505

(56) References Cited

U.S. PATENT DOCUMENTS

| | | | | |
|---|---|---|---|---|
| 4,472,788 A | * | 9/1984 | Yamazaki | 708/209 |
| 4,839,839 A | * | 6/1989 | Tokumaru et al. | 708/209 |
| 5,262,971 A | * | 11/1993 | Yamaguchi | 708/209 |
| 5,553,010 A | * | 9/1996 | Tanihira et al. | 708/209 |
| 5,671,166 A | * | 9/1997 | Omote | 708/209 |
| 5,726,926 A | * | 3/1998 | Makino | 708/505 |
| 5,978,822 A | * | 11/1999 | Muwafi et al. | 708/209 |
| 5,991,786 A | * | 11/1999 | Mahurin | 708/209 |
| 6,006,244 A | * | 12/1999 | Mahurin | 708/209 |
| 6,393,446 B1 | * | 5/2002 | Dhong et al. | 708/209 |

* cited by examiner

*Primary Examiner*—Chuong Dinh Ngo
*Assistant Examiner*—Chat C. Do
(74) *Attorney, Agent, or Firm*—Casimer K. Salys; Bracewell & Patterson, L.L.P.

(57) ABSTRACT

A method and apparatus performing rotate operations using cascaded multiplexers provides a scalable rotator circuit having a sub-field rotate capability that requires no additional interconnects at the sub-field endpoints. The rotator performs bit field swap operations at each stage of a series of cascaded multiplexers. The bit field size increases monotonically from a single bit to half of the rotator operand size. The control logic selects swap operations for each individual bit field at each stage, in order to arrange a desired rotated output vector.

6 Claims, 4 Drawing Sheets

METHOD AND APPARATUS FOR PERFORMING ROTATE OPERATIONS USING CASCADED MULTIPLEXERS

BACKGROUND OF THE INVENTION

1. Technical Field

The present invention relates generally to logic circuits for performing arithmetic operations, and more specifically to a method and apparatus for performing rotate operations using cascaded multiplexers.

2. Description of the Related Art

Rotators are used in the arithmetic logic units (ALUs) of microprocessors and are also used in dedicated logic circuits. Rotate operations in graphics applications are efficiently performed using rotators and rotating operations can also be performed in dedicated processing circuits such as parallel-to-serial converters.

High speed rotator circuits using multiplexers are well known in the art. Logarithmic rotators accomplish rotate operations by sequentially performing rotates by fixed powers of 2 in cascaded stages, selecting a rotate or not rotate operation for each stage. By using multiplexers rather than clocked registers, the shift or rotate operations may be performed within a single clock cycle. The time required to complete the operation is set by the propagation delay through the cascaded multiplexer stages.

Logarithmic rotators exhibit a non-uniformity in circuit layout, as the wires that couple the most-significant bits to the inputs of the multiplexers that select the least-significant bits (for a left rotator) are longer and therefore require higher circuit drive levels (e.g., larger transistors). For a right rotator, the same is true for the wires that couple the least-significant bits to the multiplexers that select the most-significant bits are longer.

Additionally, typical logarithmic rotate circuits cannot be used to perform sub-field rotate operations unless circuitry is added to interconnect ends of the sub-fields. Single-instruction-multiple-data (SIMD) instruction sets often include sub-field rotation operations.

Therefore, it would be desirable to provide an improved method and apparatus for performing rotate operations having a uniform, scalable circuit layout.

SUMMARY OF THE INVENTION

The objectives of performing rotate operations within a scalable, uniform circuit layout and performing subs field rotations without additional circuitry are achieved in a method and apparatus for performing rotate operations using cascaded multiplexers. Multiple cascaded sets of multiplexer pairs are used to swap bits of an input word provided by an input circuit. A control logic controls the selector inputs of the multiplexer pairs. The control logic has a rotate amount input for controlling whether or not the multiplexer pairs swap bits between bit fields within the input word. An output circuit receives the output of the final multiplexer and the control logic controls the bit field swapping so that the output of the output circuit is a rotated version of the input word, rotated by the rotate amount.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF AN ILLUSTRATIVE EMBODIMENT

Figure 1:
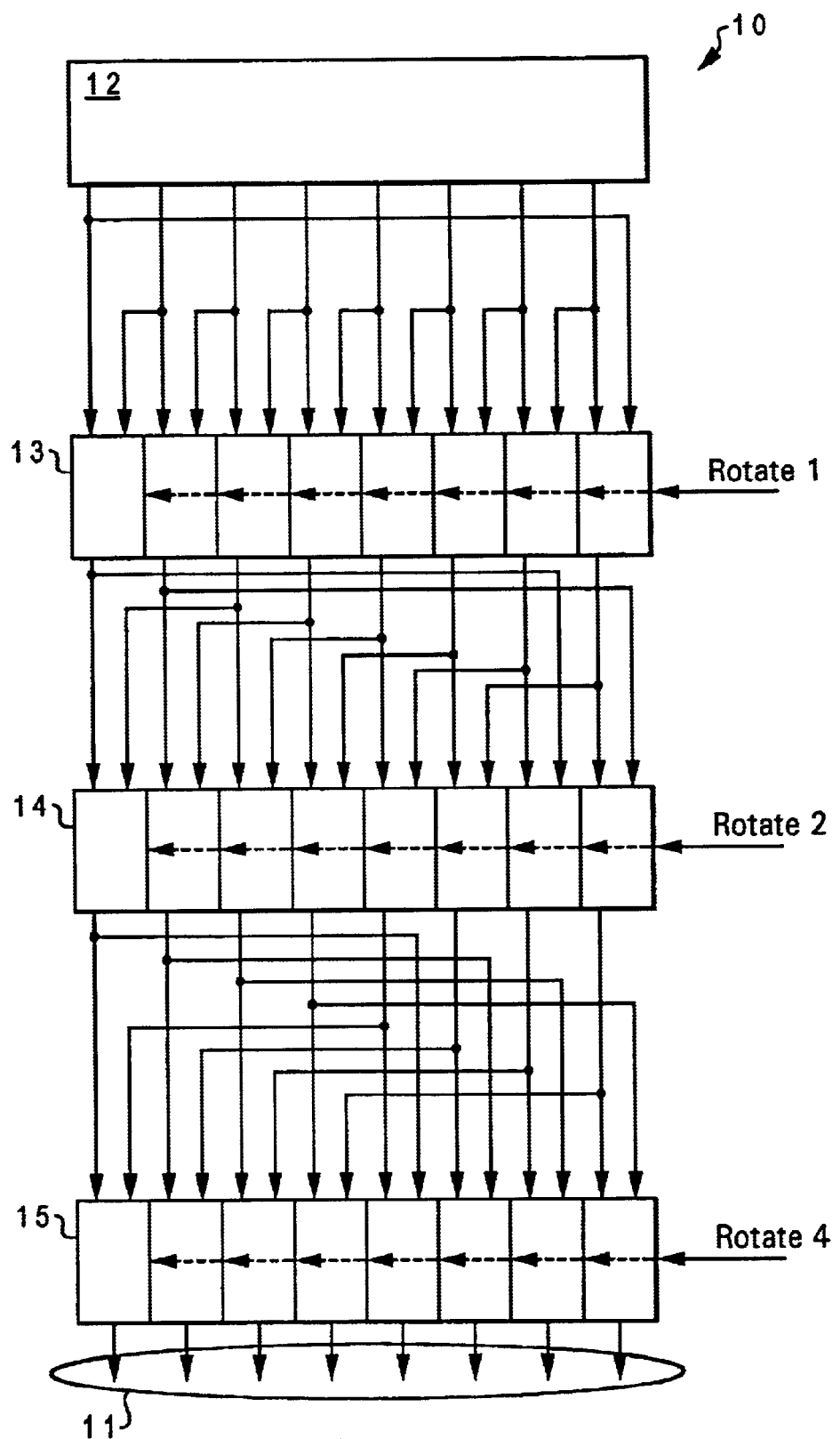
FIG. 1 is a schematic diagram of a prior art logarithmic rotator circuit.

With reference now to the figures, and in particular with reference to FIG. 1, there is depicted a schematic diagram of a prior art logarithmic rotator 10. As shown, input register 12 provides an operand to be rotated according to a rotate amount. The rotate amount is represented in FIG. 1 as three bit lines Rotate n where n is the amount of left rotate associated with each of the rotate bits. The operation of logarithmic rotator 10 is straightforward in that a logic "1" value for Rotate 1 will cause multiplexer 13 to shift the lower seven bits provided by input register 12 to the left, and the most-significant "wraparound" bit will be provided to the least-significant position. This is provided by the connection of multiplexer 13 to input register 12, whereby switches within multiplexer 13 may select the directly corresponding bit from input register 12 or the bit one position to the right. Multiplexers 13, 14, and 15 are drawn so that a logic "1" selector value will enable the right side input at each of the individual switching elements within multiplexers 13, 14, and 15.

Multiplexer 14, is connected to multiplexer 13 so that its input word bits may be selected from the same bit position of multiplexer 13 or a bit position two bits to the right (The two most significant "wraparound" input word bits may be selected from the two least significant bit outputs from multiplexer 13). This allows multiplexer 14 to rotate the input word by two bit positions to the right when the Rotate 2 signal is a logic "1". Similarly, multiplexer 15 is connected so that the directly corresponding bit from multiplexer 14 may be selected by a switching element, or from the bit position four bits to the right. This provides a rotation by 4 bits. Therefore the three cascaded multiplexers 13, 14, and 15 form an eight-bit rotator, since the combination of the Rotate n signals provides for a rotate from zero to seven bit positions. The output of multiplexer 15 is output 11, which is the value from input register 12 rotated by the rotate amount.

A first drawbacks of this topology is that circuit paths are longer for the "wraparound" signals, i.e., the signals that move the most-significant bits to the least-significant positions (or vice-versa for a right rotate operation). Since the circuit paths are longer for these bits, in a large rotator having an input word size of 64 or 128 bits, the current drive capability of the transistors driving these signals must be increased, making the circuit asymmetrical.

In addition, in order to provide a sub-field rotate capability (for example, two 32-bit rotates within a 64-bit input word) additional circuitry must be added to couple the multiplexers in the middle of the rotator, so that the "wrap-around" bits will stay within the sub-fields when the rotator operates.

Figure 2:
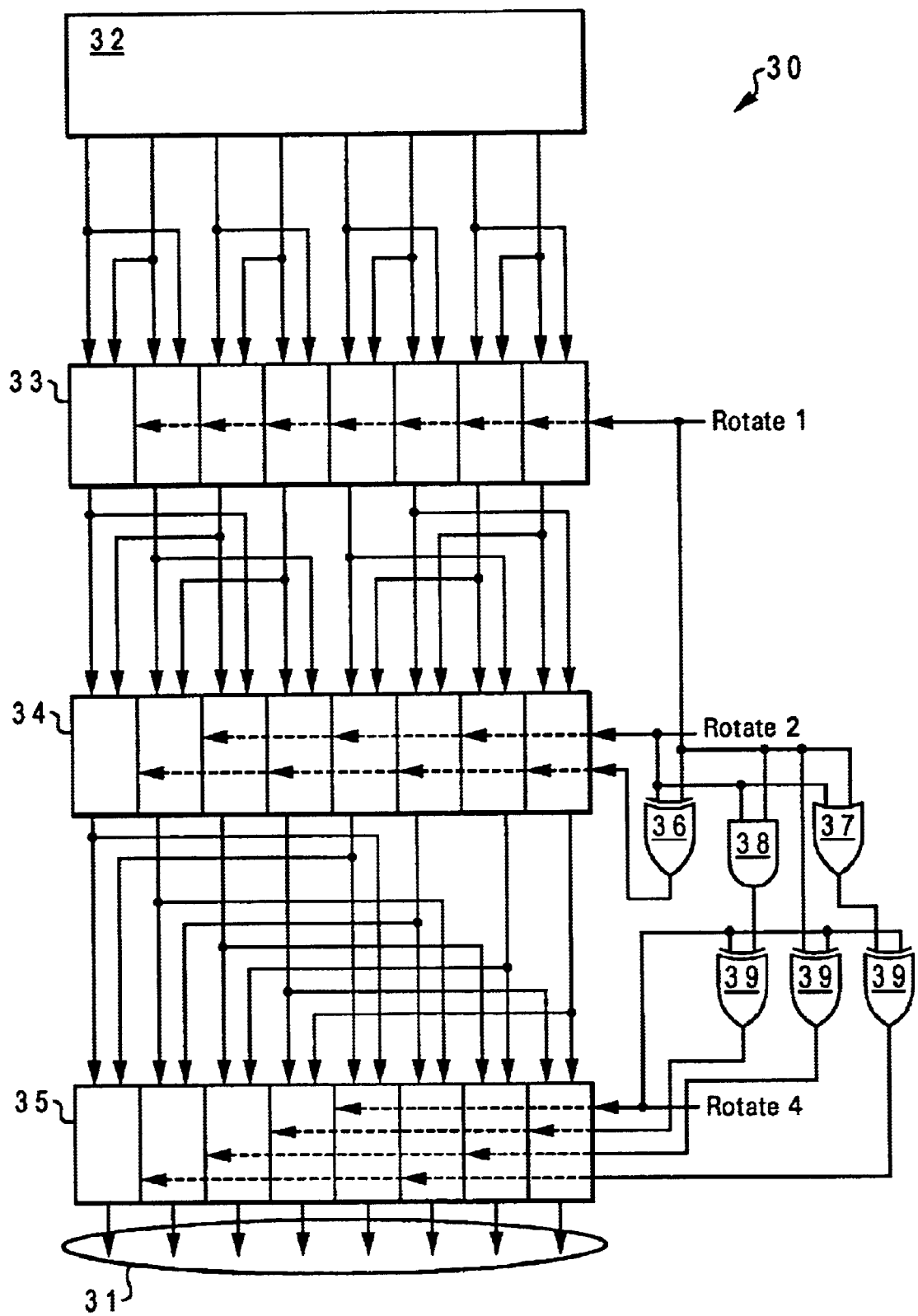
FIG. 2 is a schematic diagram of a rotator circuit in accordance with a first embodiment of the present invention.

Referring now to FIG. 2, a rotator circuit 30 in accordance with a first embodiment of the present invention is depicted. The present invention utilizes a connection of multiplexers such that bit fields are "swapped" rather than rotated, in order to provide a uniform circuit layout and allow sub-field rotations without additional multiplexer connections. Input register 32 provides the input operand word to multiplexer 33. Multiplexer 33 is configured to swap adjacent bit fields of the input operand word by selecting between the corresponding bit from input register 32 or the adjacent bit from a bit field of size two. Multiplexer 34 is connected to select from the corresponding bit output of multiplexer 33 or a bit two positions away within a bit field of size four. In the last stage, multiplexer 35 is connected to select between corresponding bit outputs of multiplexer 34 or bits four positions away in the alternate half of the input word. This corresponds to a bit field of size eight, which is the entire size of the input operand. It should be noted that the bit fields of the preferred embodiment are sized in powers of two and a multiplexer is provided for each bit field size from two to the size of the input operand. The multiplexer for a particular bit field size will selectively swap individual bits between one half of a bit field and the other half. For example, multiplexer 34 will swap bits 5 and 7 and/or bits 4 and 6 (which are swaps between halves of a bit field of size four) and will also swap bits 0 and 2 and/or bits 1 and 3. The output of multiplexer 35 is output 31, which is the value from input register 32 rotated by the rotate amount.

The control logic used to select the multiplexer switch positions is more complex than that required for the logarithmic rotator of FIG. 1, but can be produced with a circuit that progressively generates the control signal for a multiplexer level from the control for the previous level. For the rotator 30 depicted in FIG. 2, this works to a functional advantage in that the propagation of the control signals through the cascaded network is faster than the propagation of the logic signals through the multiplexer. Therefore, the added complexity of the control logic in the present invention does not increase evaluation time over that of a logarithmic rotator using equivalent multiplexers.

For a logarithmic rotator, the operation follows the form:

$$a(n,i)=A(((i-r) \bmod 2^n) \bmod 2^N)$$

where $A(i)$ is the input bit vector of size $2^N$, $a(n,i)$ is the $i^{th}$ bit at multiplexer level n and the rotator has N levels, therefore $a(N,i)$ represents the output bit vector. "mod" is the modulo operator and "/" is the division operator satisfying $i=i/k \times k+i \bmod k$.

The control logic for the rotator of the present invention is more complex than that for the logarithmic rotator, but can be derived by calculating:

$$a(n+1,i)=a(n, i/2^{n+1} \times 2^{n+1}+(i-r)/2^n \bmod 2 \times 2^n + i \bmod 2^n)$$

for each n<N. The $(i-r)/2^n \bmod 2$ term in the above expression is the $n^{th}$ bit of i−r, which can be bitwise expanded in the expression:

$$a(n+1,i)=a(n, i/2^{n+1} \times 2^{n+1}+(i_n - r_n + c(n,i)) \bmod 2 \times 2^n + i/2^n)$$

where $c(n,i)$ is the $n^{th}$ bit of a carry resulting from the operation i−r. To arrive at the actual control signals, $d(n,i)$ may be defined as $-c(n,i)$, since $c(n,1)$ will be −1 or 0. The condition under which $a(n, i/2^{n+1} \times 2^{n+1}+i/2^n)$ and $a(n, i/2^{n+1} \times 2^{n+1}+i/2^n+2^n)$ are swapped is:

$$r_n \text{ xor } d(n,i/2^n)$$

and the swap condition for multiplexer level n depends only on $d(n,0) \ldots d(n,2^n-1)$. For the rotator depicted in FIG. 2, the following $d(n,i)$ values may be calculated:

$d(0,0)=0$
$d(1,0)=r_0$
$d(1,1)=0$
$d(2,0)=r_0 \text{ OR } r_1$
$d(2,1)=r_1$
$d(2,2)=r_0 \text{ AND } r_1$
$d(2,3)=0$ and the actual swap controls are computed from $r_n$ xor $d(n, i/2^n)$ as described above, yielding:

$s(0,0)=r_0$
$s(1,0)=r_1 \text{ xor } r_0$
$s(1,1)=r_1$
$s(2,0)=r_2 \text{ xor } (r_0 \text{ OR } r_1)$
$s(2,1)=r_2 \text{ xor } r_1$
$s(2,2)=r_2 \text{ xor } (r_0 \text{ AND } r_1)$
$s(2,3)=r_2$ which are implemented by XOR gate 36, OR gate 37, AND gate 38 for multiplexer 34 at level 1, and XOR gates 39 for multiplexer 35 at level 2.

Figure 3:
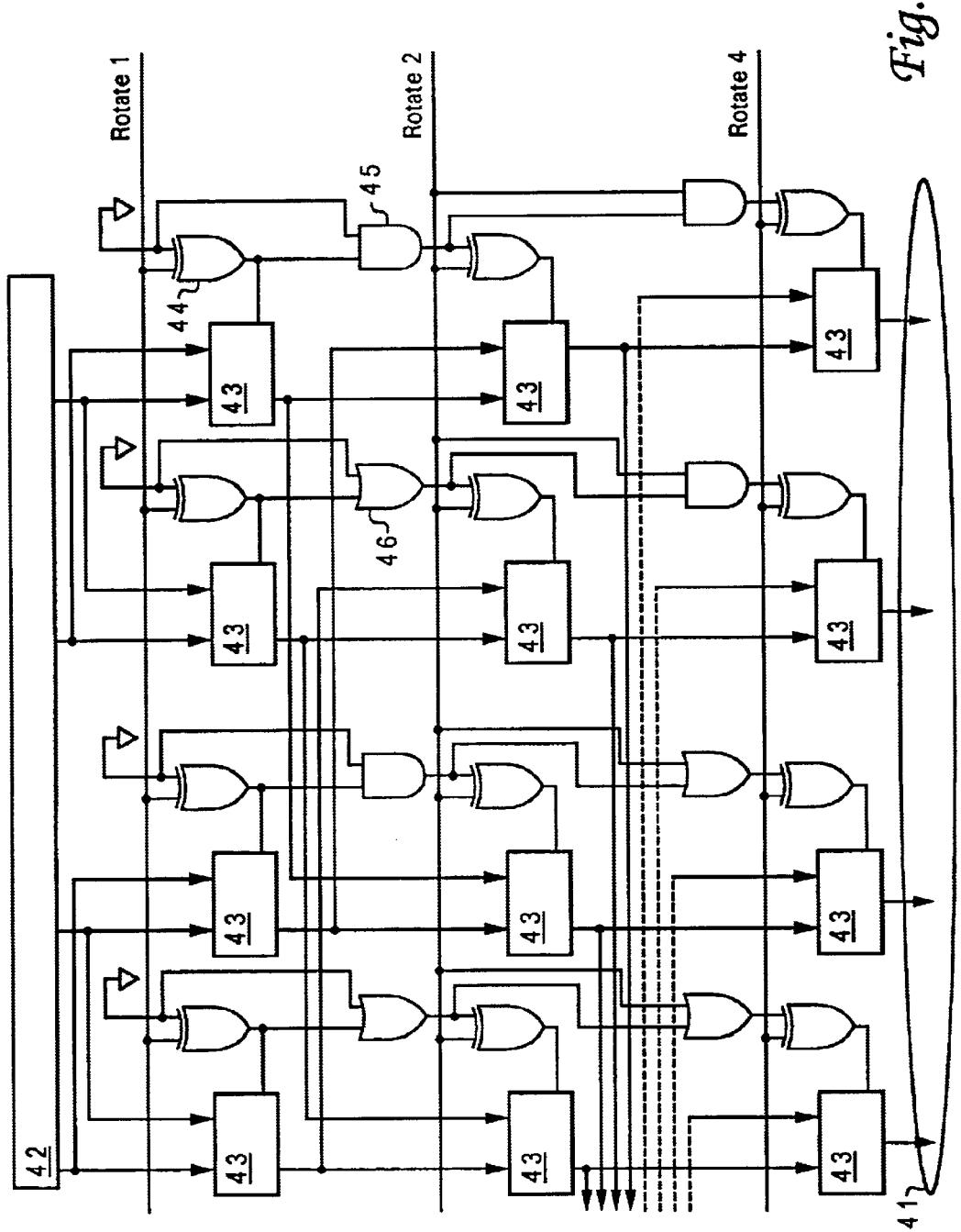
FIG. 3 is a schematic diagram of a rotator circuit in accordance with a second embodiment of the present invention.

Referring now to FIG. 3, an alternative embodiment of the present invention is depicted. In this embodiment, the control logic is evenly distributed throughout the rotator. This is a repetitive structure that will yield the proper $s(n,i)$ for rotators of arbitrary size. Multiplexers 43 perform bit swapping operations. XOR gates 44 at each multiplexer switch generate the control for the multiplexer switches, and AND gates 45 and OR gates 46 generate a sum and carry result for input to the next stage of multiplexer control. This topology has an advantage of circuit uniformity. For circuit layouts where the gates will fit beneath wiring tracks for the multiplexer data flow, no additional chip area will be required. The output of multiplexer 45 is output 41, which is the value from input register 42 rotated by the rotate amount.

The above control values are for a right rotate operation for positive values of r. In order to rotate left, the carry input of the first level control logic is set to a logic "1" and the rotate amount value is inverted. This will yield a rotate in the opposite direction.

Additionally, to perform sub-field rotates, the swap signals of the multiplexers connected to swap fields larger than the desired sub-fields must be disabled. This can be accomplished by AND gates inserted between each of the XOR gate 44 outputs and the multiplexer switches, with a sub-field rotate control signal disabling the multiplexer level by providing a logic low level at a second input to the AND gates.

Figure 4:
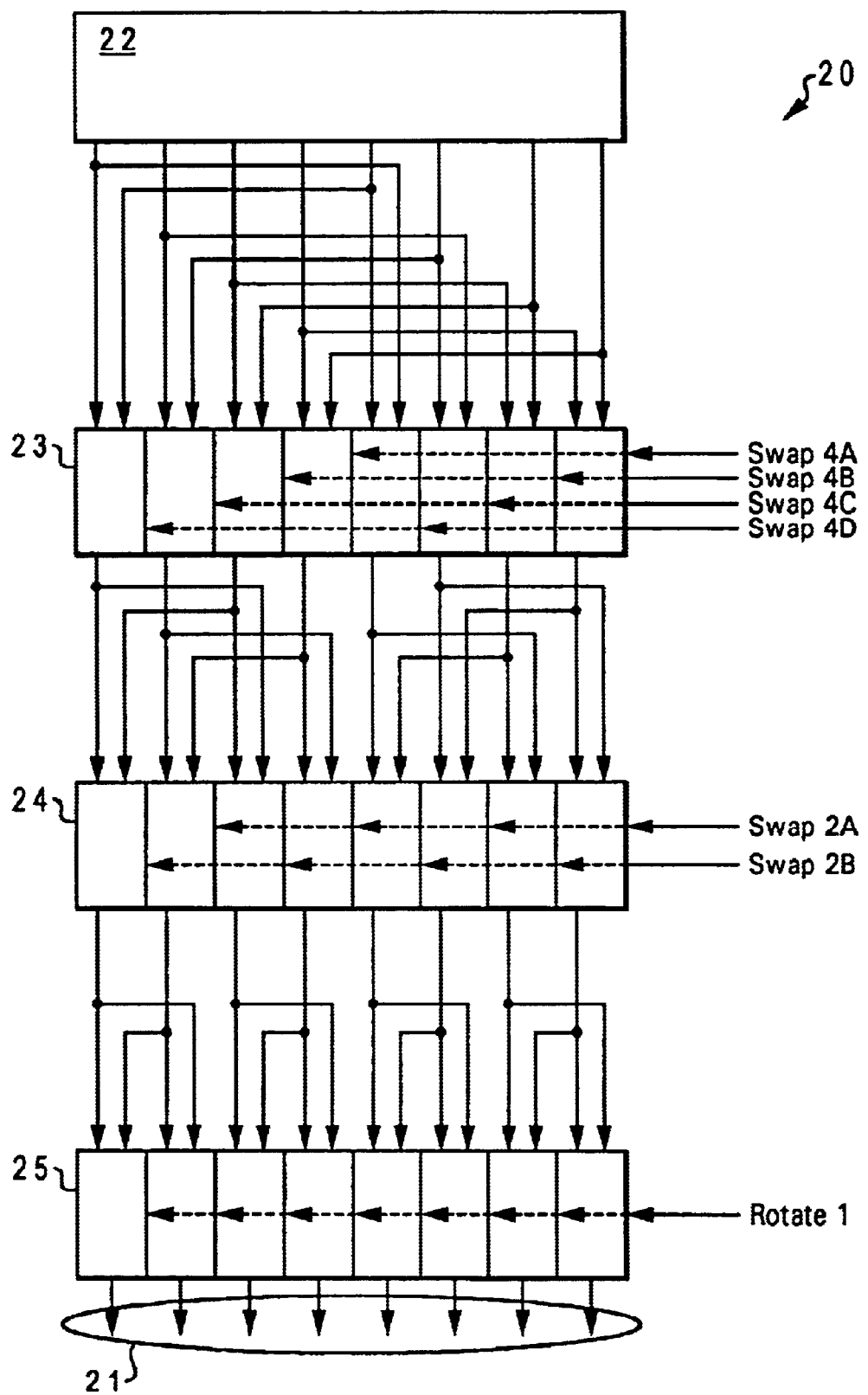
FIG. 4 is a schematic diagram of a rotator circuits in accordance with a third embodiment of the present invention.

Referring now to FIG. 4, an alternative embodiment of the present invention is shown. In this embodiment, the swap of the largest bit field (size 4) is performed first and the swap of adjacent bits in bit fields of size 1 is performed last. The control for this rotator is different, but represents a rotate performed in an opposite direction. Therefore, for a right rotate operation as described for the circuits of FIG. 2 and FIG. 3, the input carry would be asserted and the rotate amount inverted.

Other embodiments of the invention are possible, particularly with respect to grouping the pairs of multiplexer switches into larger groups. The control logic for these configurations, such as using 4-way or 8-way switches can be derived in a manner similar to that used above, with swapping occurring between groups of bits larger than two.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A rotator circuit comprising:
    an input circuit for receiving a binary input operand;
    multiple sets of multiplexers, coupled to said input circuit, for swapping bits of an associated input word received at an input of each of said sets of multiplexers;
    an output circuit, coupled to said multiple sets of multiplexers for providing a rotated binary output; and
    a control logic circuit, coupled to selector inputs of said multiple sets of multiplexers, wherein said control logic circuit includes a rotate amount input for controlling whether or not a particular one of said multiple sets of multiplexers swap bits between bit fields within said associated input word, so that said rotated binary output is based on a rotation by said rotate amount input of said binary input operand, wherein said control logic circuit includes a plurality of carry generators, wherein one of said plurality of carry generators is coupled to a rotate bit and to an output of a carry generator from a previous set of said multiple sets of multiplexers, wherein said control logic circuit further comprises a plurality of carry generators, each coupled to a second multiplexer from each of said multiplexer pairs, wherein each carry generator is coupled to said rotate bit and further to an output of a sum generator from a previous set of multiplexer pairs, wherein said plurality of carry generators include a plurality of OR gates.

2. The rotator circuit of claim 1, wherein a first set of said multiple of sets of multiplexers swaps bits between a most-significant half of said binary input operand and a least-significant half of said binary input operand.

3. The rotator circuit of claim 1, wherein said control logic circuit includes a plurality of exclusive-OR gates.

4. The rotator circuit of claim 1, wherein said plurality of carry generators include a plurality of AND gates.

5. A rotator circuit comprising:
    an input circuit for receiving a binary input operand;
    a first set of multiplexers, coupled to said input circuit, for swapping adjacent bits of said binary input operand to yield first intermediate result;
    a second set of multiplexers, coupled to said first set of multiplexers, for swapping bits of said first intermediate result to yield a second intermediate result, wherein said bits of said first intermediate result are separated by two bit positions;
    a third set of multiplexers, coupled to said second set of multiplexers, for swapping bits of said second intermediate result to yield a rotated binary output, wherein said bits of said second intermediate result are separated by four bit positions; and
    a control logic circuit, coupled to selector inputs of said first, second, and third sets of multiplexers, wherein said control logic circuit includes a rotate amount input such that said rotated binary output is based on a rotation by said rotate amount input of said binary input operand, wherein said control logic circuit further includes
        a first exclusive-OR gate having a first XOR input coupled to a least significant bit of said rotate amount input, a second XOR input coupled to a next least significant bit of said rotate amount input, and a first XOR output coupled to selector inputs of alternate switches within said second set of multiplexers;
        an OR gate having a first OR input coupled to a least significant bit of said rotate amount input, a second OR input coupled to a next least significant bit of said rotate amount input, and an OR output coupled to a second exclusive-OR gate having an output coupled to an selector input of a first pair of switches within said third set of multiplexers; and
        an AND gate having a first AND input coupled to a least significant bit of said rotate amount input, a second AND input coupled to a next least significant bit of said rotate amount input, and an AND output coupled to a third exclusive-OR gate having an output coupled to selector inputs of a second pair of switches within said second set of multiplexer, wherein said switches are separated by two bit positions.

6. The rotator circuit of claim 5, wherein said control logic circuit includes an exclusive-OR gate having a first XOR input coupled to a least significant bit of said rotate amount input, a second XOR input coupled to a next least significant bit of said rotate amount input, and an XOR output coupled to selector inputs of alternate switches within said second set of multiplexers.

* * * * *